(12) United States Patent
White

(10) Patent No.: US 7,614,583 B2
(45) Date of Patent: Nov. 10, 2009

(54) MONUMENT FITTING ASSEMBLY

(75) Inventor: Walter L. White, Everett, WA (US)

(73) Assignee: The Boeing Company, Chicago, IL (US)

( * ) Notice: Subject to any disclaimer, the term of this patent is extended or adjusted under 35 U.S.C. 154(b) by 603 days.

(21) Appl. No.: 11/306,030

(22) Filed: Dec. 14, 2005

(65) Prior Publication Data

US 2007/0262212 A1 Nov. 15, 2007

(51) Int. Cl.
*B64C 1/20* (2006.01)
(52) U.S. Cl. ............... 244/118.1; 244/118.6; 248/188.1; 248/188.8; 248/500; 248/680
(58) Field of Classification Search ............. 244/118.1, 244/118.6; 248/188.1, 188.8, 500, 680; 292/137, 292/138, 143, 146, 150, 302
See application file for complete search history.

(56) References Cited

U.S. PATENT DOCUMENTS

| | | | | |
|---|---|---|---|---|
| 3,257,970 A | * | 6/1966 | Gutridge | 410/73 |
| 4,771,969 A | * | 9/1988 | Dowd | 244/118.6 |
| 5,058,829 A | * | 10/1991 | Bentley | 244/122 R |
| 5,178,346 A | * | 1/1993 | Beroth | 244/122 R |
| 5,346,161 A | * | 9/1994 | Eilenstein-Wiegmann et al. | 244/137.1 |
| 5,531,404 A | * | 7/1996 | Marechal | 244/118.6 |
| 6,260,813 B1 | * | 7/2001 | Whitcomb | 248/503.1 |

* cited by examiner

*Primary Examiner*—Michael R Mansen
*Assistant Examiner*—Philip J Bonzell
(74) *Attorney, Agent, or Firm*—Ostrager Chong Flaherty & Broitman P.C.

(57) ABSTRACT

A monument fitting assembly for installing a monument in an aircraft. The fitting assembly is comprised of a ramp member and a fastening bracket member. The ramp member is attached to a floor of the aircraft. Further, the fastening bracket member is attached to a monument. The fastening bracket member is releasably attached to the ramp member and positions the monument a predetermined height above the floor in a predetermined position within the aircraft and supports the monument in a plurality of load-bearing directions.

10 Claims, 7 Drawing Sheets

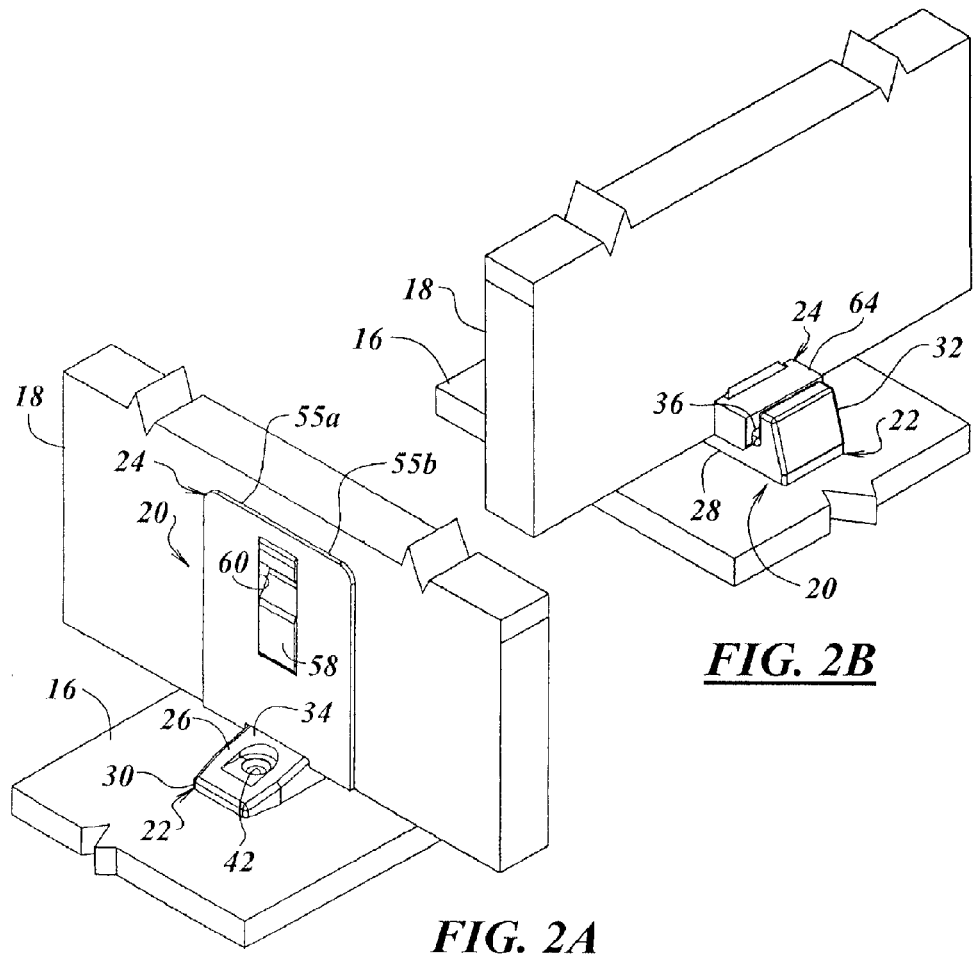
*FIG. 2B*
*FIG. 2A*
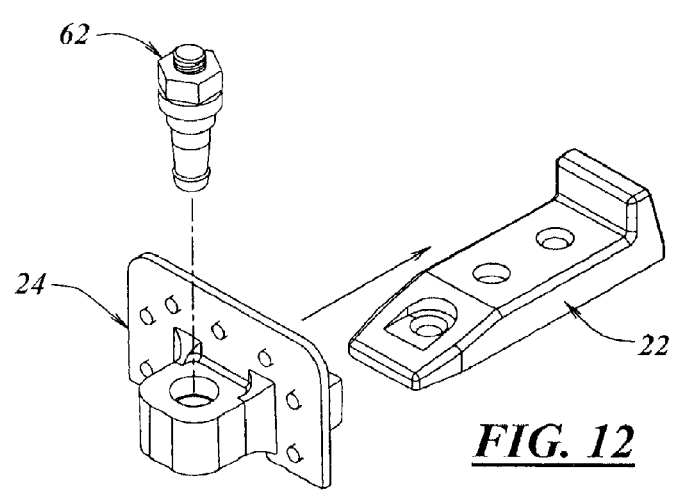
*FIG. 12*

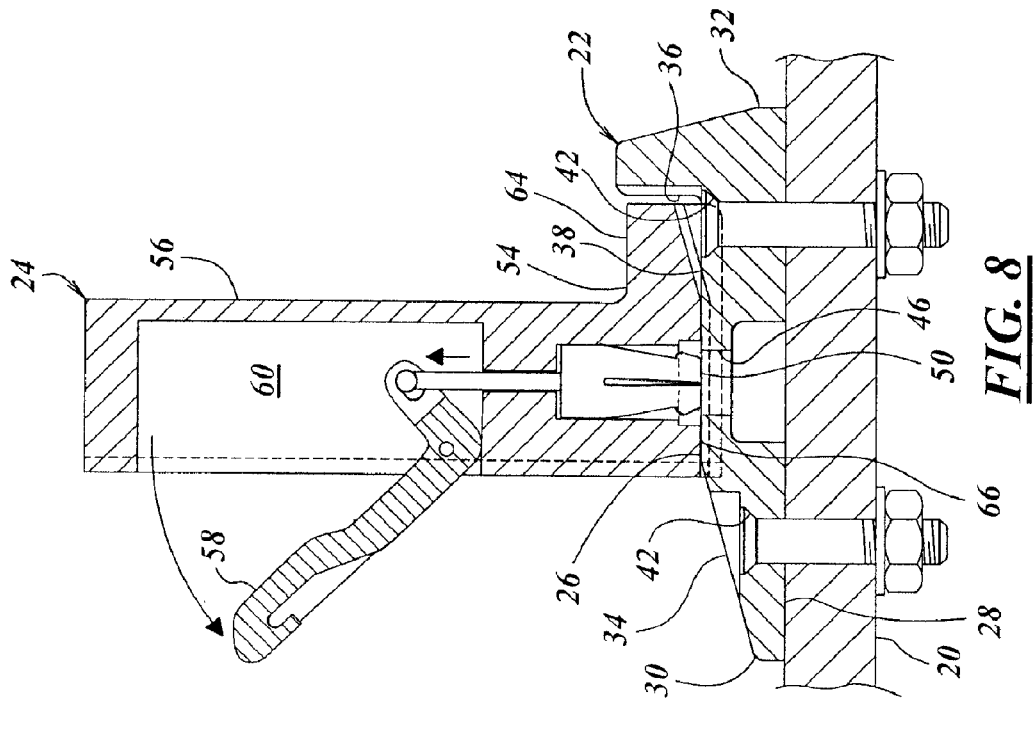
FIG. 8
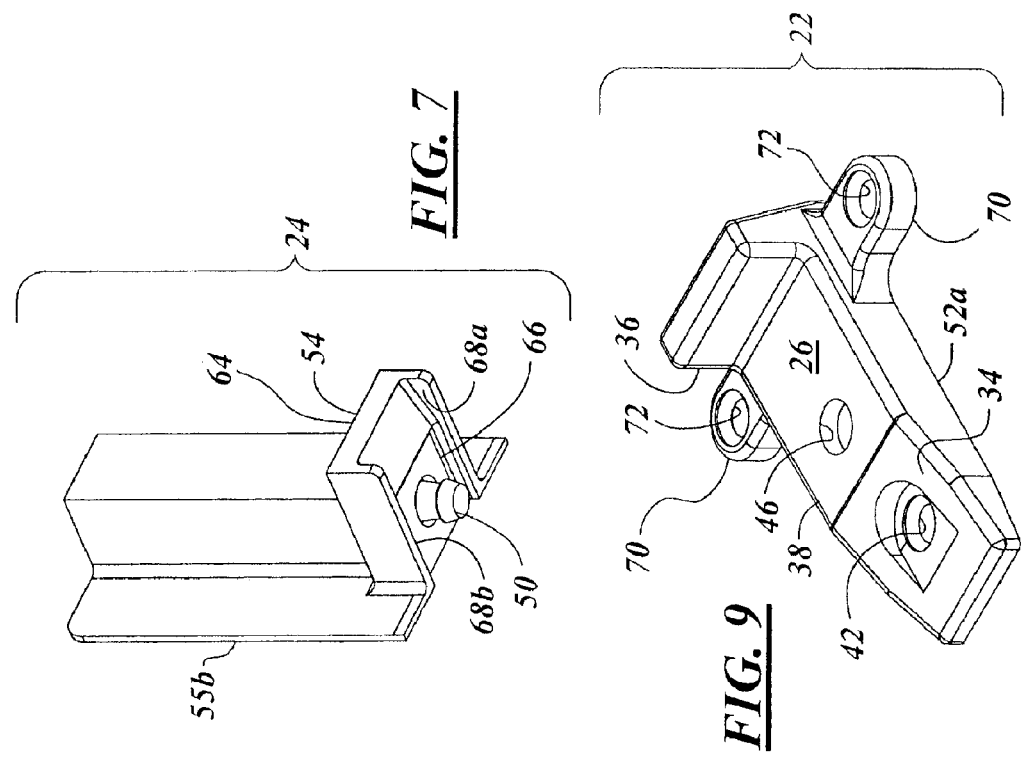
FIG. 7
FIG. 9

MONUMENT FITTING ASSEMBLY

FIELD OF THE INVENTION

The present invention relates generally to airplanes, and more particularly to mechanisms for installing monuments in airplanes.

BACKGROUND DESCRIPTION

There are various methods and mechanisms known today for installing monuments in airplanes. Examples of such monuments include lavatories, galleys, closets, purser work stations, video control centers, and crew rests. Prior to installation, a substantial amount of time is needed to prepare the floor with liquid sealants. In this respect, the sealants can decrease corrosion or other damage caused by moisture between the floor and the monument. Thereafter, the monuments typically are aligned with secondary structural members, e.g. intercostals, between floor beams of the floor. In addition, a substantial number of threaded fasteners typically are utilized in combination with the secondary structures for installing the monuments. These known installation methods and mechanisms can be time-consuming and expensive to utilize.

It would, therefore, be highly desirable to provide a monument fitting assembly which substantially decreases moisture traveling from the aircraft floor to the monument and also can be installed onto an airframe in a faster and less expensive manner.

SUMMARY OF THE INVENTION

An embodiment of the invention is a monument fitting assembly for an aircraft. The assembly is comprised of a ramp member and a fastening bracket member. The ramp member is attached to a floor of the aircraft, and the fastening bracket member is attached to a monument. The fastening bracket member is releasably attached to the ramp member. The fitting assembly positions the monument a predetermined height above the floor in a predetermined position and supports the monument in a series of load-bearing directions.

One advantage of the claimed invention is that a monument fitting assembly is provided that decreases the manufacturing cycle time of an aircraft and thus decreases the cost of manufacture associated therewith.

Another advantage of the claimed invention is that a monument fitting assembly is provided that minimizes the need for jigs, fixtures, lift devices, and other tools, which would otherwise be required to position and install a monument in an aircraft.

Yet another advantage of the invention is that a monument fitting assembly is provided that decreases the number of threaded fasteners and secondary structural members for installing the monument in the aircraft.

Still another advantage of the invention is that a monument fitting assembly is provided that decreases the wear experienced by various tooling thereby decreasing maintenance of that tooling and the costs associated therewith.

Another advantage of the invention is that a monument fitting assembly is provided that secures a monument within an aircraft against a substantial number of load directions.

Yet another advantage of the invention is that a monument fitting assembly is provided that provides clearance between the monument and the floor and therefore eliminates tie-down attachments and/or threaded fasteners within the wet area under plumbed monuments, e.g. the galleys and the lavatories, thereby decreasing the risk of structural corrosion.

The features, functions, and advantages can be achieved independently and in various embodiments of the present invention or may be combined in yet other embodiments.

BRIEF DESCRIPTION OF THE DRAWINGS

For a more complete understanding of this invention, reference should now be made to the embodiments illustrated in greater detail in the accompanying drawings and described below by way of examples of the invention:

FIGS. 2A and 2B are enlarged outboard and inboard perspective cutaway views of the aircraft shown in FIG. 1B.

FIG. 7 is a rear bottom perspective view of the fastening bracket member for the monument fitting assembly shown in FIG. 6.

FIG. 8 is a cross-sectional view of the monument fitting assembly shown in FIG. 5, illustrating the monument fitting assembly in an unfastened position.

FIG. 9 is a perspective view of a ramp member for the monument fitting shown in FIGS. 1A and 1B, according to an alternative embodiment of the claimed invention.

FIG. 12 is an exploded view of the monument fitting shown in FIGS. 1A and 1B, according to another alternative embodiment of the claimed invention.

DETAILED DESCRIPTION OF THE INVENTION

Figure 1A:
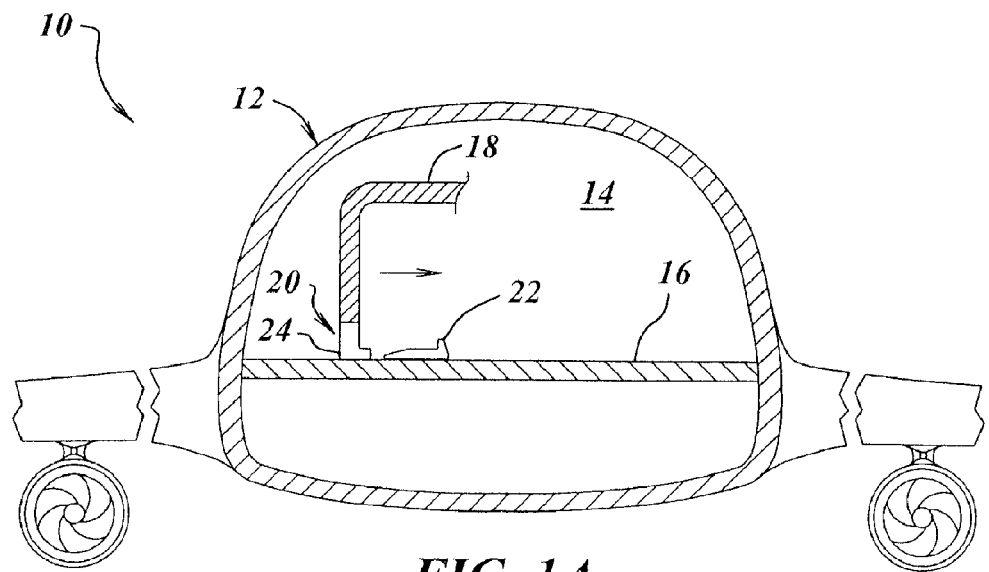
FIG. 1A is a cross-sectional view of an aircraft, illustrating movement of a monument therein for installation onto the aircraft by a monument fitting assembly, according to one advantageous embodiment of the claimed invention.

In the following figures, the same reference numerals are used to identify the same or similar components in the various representative views.

The present invention is particularly suited for a monument fitting assembly for installing a monument within an aircraft. Accordingly, the embodiments described herein employ features where the context permits, e.g. when a specific result or advantage of the claimed invention is desired. However, it is contemplated that the monument fitting assembly can be utilized for other suitable applications as desired. In this respect, a variety of other embodiments are contemplated having different combinations of the described features, having features other than those described herein, or even lacking one or more of those features.

Figure 1B:
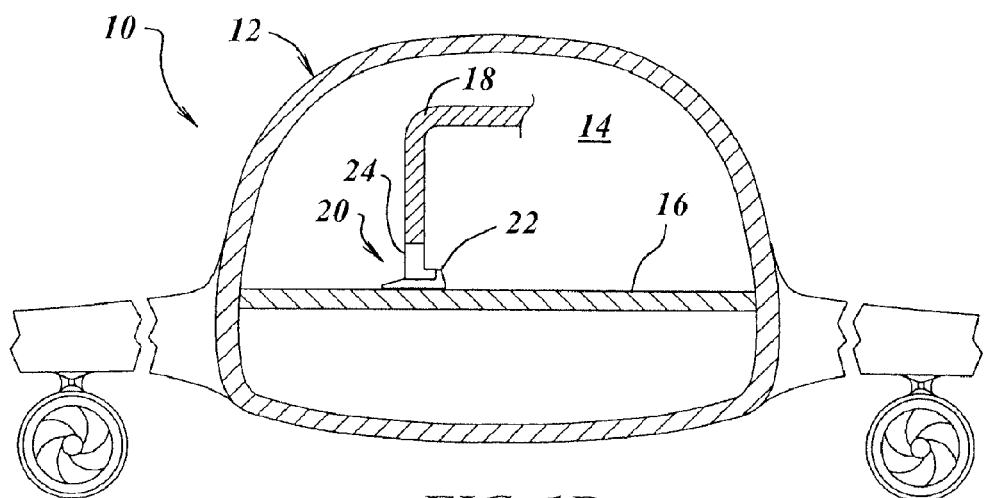
FIG. 1B is a cross-sectional view of the aircraft shown in FIG. 1A, illustrating the monument installed on the aircraft by the monument fitting assembly.

Referring to FIGS. 1A and 1B, there are shown cross-sectional views of an aircraft 10 comprised of an airframe 12 having an interior 14 with a floor 16 therein and a monument 18 installed on the floor 16 by a monument fitting assembly 20 ("fitting assembly"). The monument 18 is a lavatory, galley, closet, purser work station, video control center, crew rest, or other suitable monument. FIGS. 2A and 2B are enlarged outboard and inboard perspective cutaway views of the monument 18 secured to the aircraft 10 by the fitting assembly 20.

As detailed below, the fitting assembly 20 has a self-aligning construction for quickly installing the monument 18 in a predetermined position within the aircraft 10. In that way, the fitting assembly 20 minimizes the need for jigs, fixtures, lift devices, and other tools, which would otherwise be required to position and install a monument in the aircraft 10. The fitting assembly 20 also provides a predetermined clearance between the monument 18 and the aircraft floor 16. This feature is beneficial for eliminating the capillary action of drawing moisture from the floor 16 to the monument 18 and thus substantially decreases corrosion and other damage to the monument 18.

Figure 3:
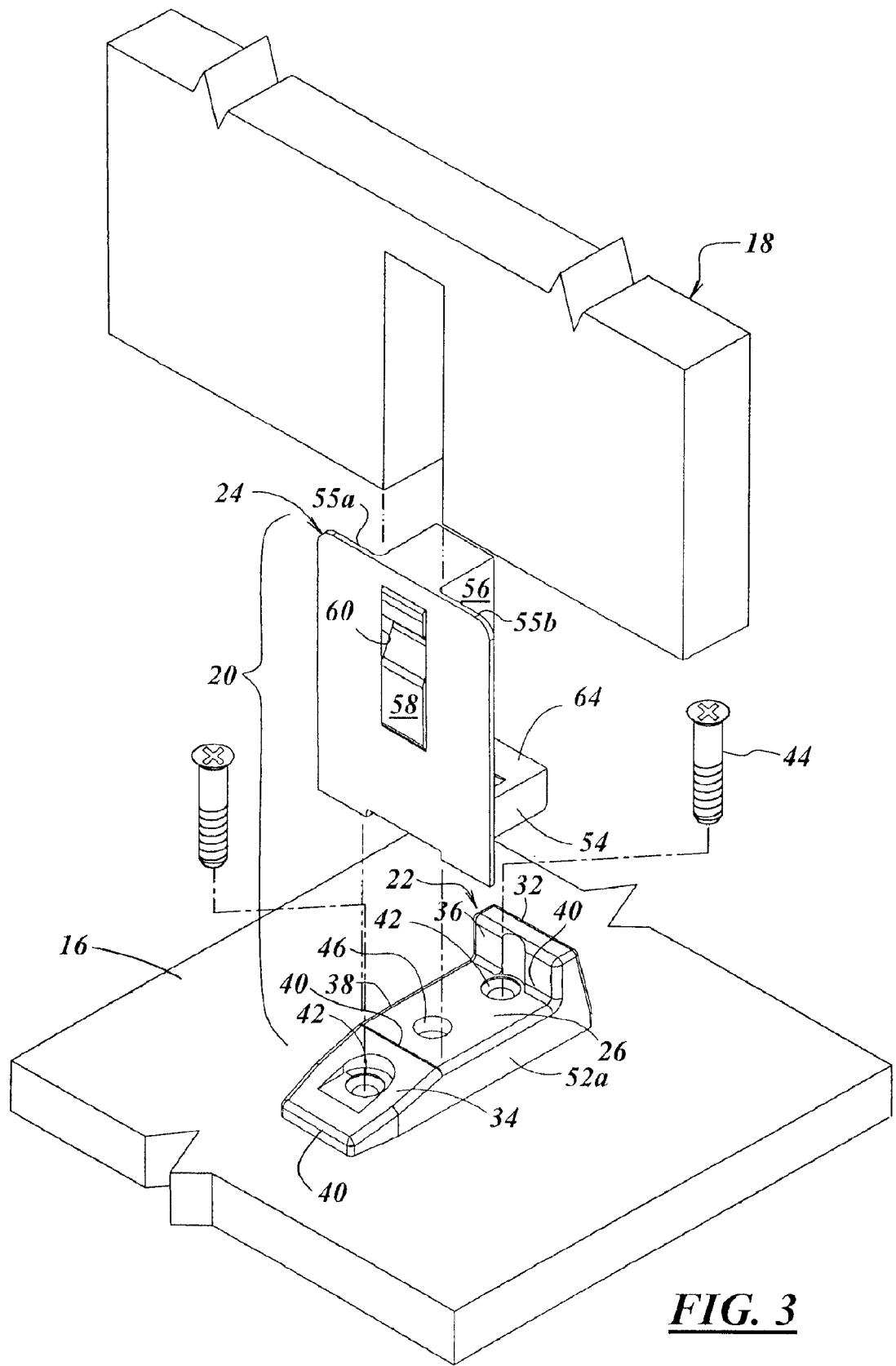
FIG. 3 is an exploded view of the aircraft shown in FIG. 2A.
Figure 4:
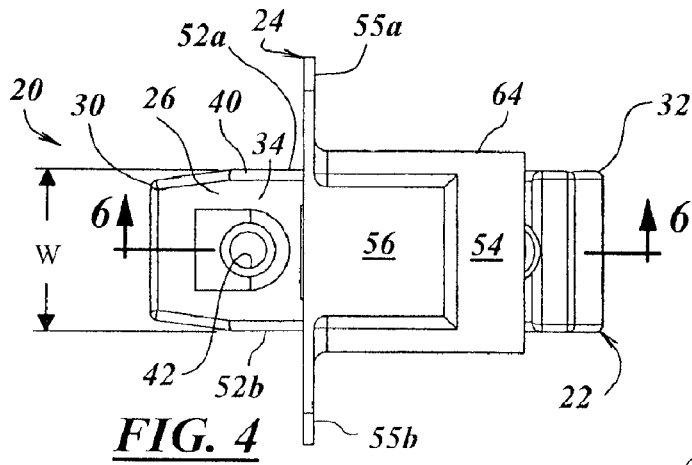
FIG. 4 is a top plan view of the monument fitting assembly shown in FIG. 1B.
Figure 5:
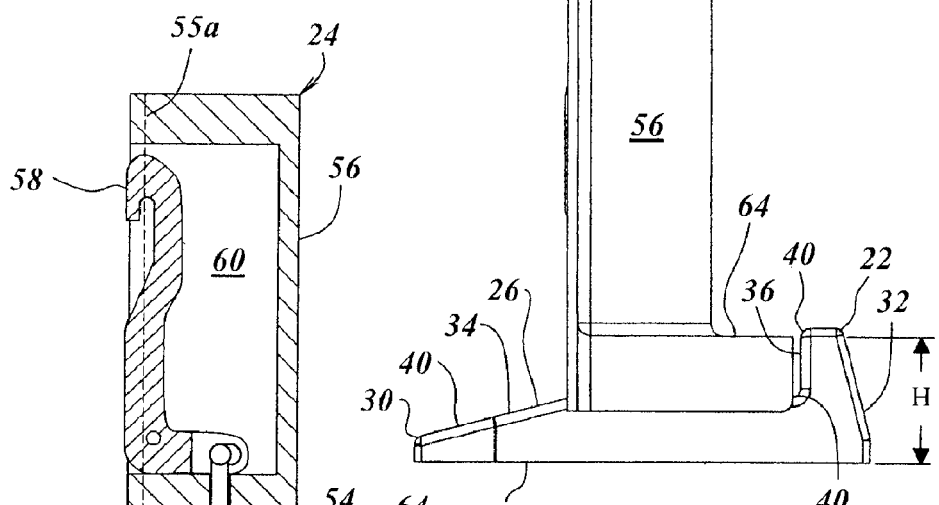
FIG. 5 is a side plan view of the monument fitting assembly shown in FIG. 1B.

With attention to FIG. 3, the fitting assembly 20 is comprised of a ramp member 22 and a fastening bracket member 24. The ramp member 22 is attached to a floor 16 of the aircraft 10, and the fastening bracket member 24 is attached to the monument 18. The fastening bracket member 24 is releasably attached to the ramp member 22 and positions the monument 18 a predetermined height above the floor 16 in a predetermined position within the aircraft 10. FIGS. 4 and 5 respectively show top and side plan views of the fitting assembly 20.

Figure 6:
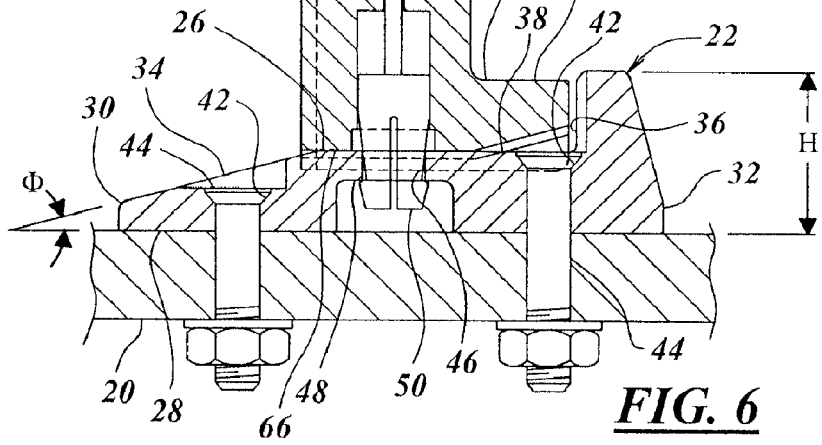
FIG. 6 is a cross-sectional view of the monument fitting assembly shown in FIG. 5, as taken along line 6-6 and illustrating the monument fitting assembly in a fastened position.

As best shown in FIG. 6, the ramp member 22 has a top surface 26, a bottom surface 28, a height (H) between the top surface 26 and the bottom surface 28, a first end portion 30, and a second end portion 32. The height (H) between the top surface 26 and the bottom surface 28 generally increases from the first end portion 30 to the second end portion 32.

In particular, the top surface 26 is comprised of an inclined surface 34, a stop guide surface 36, and a level mounting surface 38 therebetween. The inclined surface 34 is adjacent to the first end portion 30 and is offset from the bottom surface 28 by a predetermined angle φ. The inclined surface 34 slides the fastening bracket member 24 thereacross and elevates the monument 18 to a predetermined height above the floor 16. The stop guide surface 36 is adjacent to the second end portion 32 and is positioned substantially perpendicular to the bottom surface 28. The level mounting surface 38 extends between the inclined surface 34 and the stop guide surface 36. The level mounting surface 38 is positioned substantially parallel to the bottom surface 28 and supports the fastening bracket member 24. The inclined surface 34, the level mounting surface 38, and the stop guide surface 36 have rounded edges 40 (best shown in FIG. 3) therebetween for sliding the fastening bracket member 24 thereacross and enhancing the safety of installing the monument 18 in the aircraft 10.

The ramp member 22 has one or more countersunk holes 42 extending between the top surface 26 and the bottom surface 28. These holes 42 receive one or more bolt fasteners 44 for attaching the ramp member 22 to the floor 16 of the aircraft 10 in a predetermined location.

The ramp member 22 further includes an aperture 46 and a seat 48. The aperture 46 is formed in the top surface 26 with the seat 48 adjacent thereto. As detailed below, the aperture 46 is utilized for receiving a fastening arm member 50 extending from the fastening bracket member 24 and releasably attaching the fastening bracket member 24 to the ramp member 22. Accordingly, the fastening bracket member 24 secures the monument 18 to the airframe 12 in a predetermined position.

As best shown in FIG. 4, the ramp member 22 further includes opposing sidewall surfaces 52a, 52b extending between the first end portion 30 and the second end portion 32. The ramp member 22 has a width W between the opposing sidewall surfaces 52a, 52b. This width decreases from the second end portion 32 to the first end portion 30. In this respect, as detailed below, the first end portion 30 has a tapered width for readily inserting into the fastening bracket member 24 and aligning the monument 18 in a predetermined position. As detailed in the description for FIGS. 9, 10, 11A, and 11B, it is contemplated that the ramp member 22 can have other suitable constructions as desired.

Referring back to FIG. 6, the fastening bracket member 24 is comprised of a first bracket portion 54, a second bracket portion 56, and the fastening arm member 50. In this embodiment, the second bracket portion 56 extends substantially perpendicularly from the first bracket portion 54 and has a pair of planar flanges 55a, 55b (shown in FIGS. 2A and 4) attached to the monument 18 by threaded bolts (not shown) or other suitable fasteners. The first bracket portion 54 has the fastening arm member 50 extendable therefrom for releasably attaching the first bracket portion 54 to the ramp member 22. In this embodiment, the fastening arm member 50 is an expandable collet. However, it is contemplated that the fastening arm member 50 can be other suitable fasteners as desired.

Additionally, the fastening bracket member 50 also includes an actuator 58 for moving the fastening arm member 50 between a fastened position (shown in FIG. 6) and an unfastened position (shown in FIG. 8). In the embodiment shown in FIGS. 6 and 8, the actuator 58 is a lever mechanism. The lever mechanism is stored substantially within a recessed portion 60 of the second bracket portion 56. As exemplified in the embodiment shown in FIG. 12, the actuator 58 can instead be a retention bolt member and nut fastener 62 or other suitable actuators as desired.

As shown in FIG. 7, the first bracket portion 54 has a generally U-shaped construction for supporting the monument 18 in at least three orthogonal directions. In particular, the first bracket portion 54 has an upper surface 64, a lower surface 66, and a pair of opposing lateral surfaces 68a, 68b extending substantially perpendicularly from the lower surface 66. The lower surface 66 and the lateral surfaces 68a, 68b respectively are supported by the top surface 26 and the sidewall surfaces 52a, 52b of the ramp member 22 (best shown in FIG. 4).

With attention now to FIG. 9, there is shown the ramp member 22 according to an alternative embodiment of the claimed invention. In this embodiment, the opposing lateral surfaces 68a, 68b have a pair of flanges 70 extending therefrom with one or more orifices 72 for receiving one or more bolt fasteners (not shown) and attaching the ramp member 22 directly to the floor 16 of the airframe 12. It will be appreciated that this construction provides a substantially wide and stable base.

Figure 10:
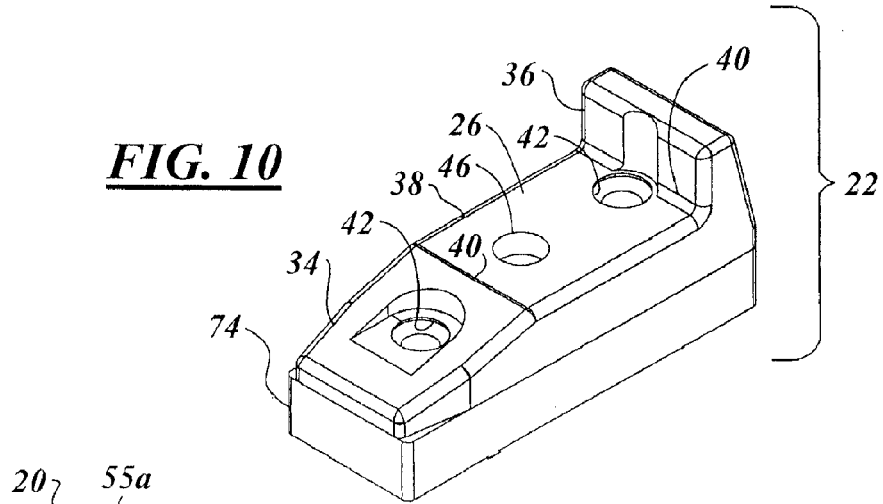
FIG. 10 is a perspective view of a ramp member for the monument fitting shown in FIGS. 1A and 1B, according to another alternative embodiment of the claimed invention.
Figure 11A:
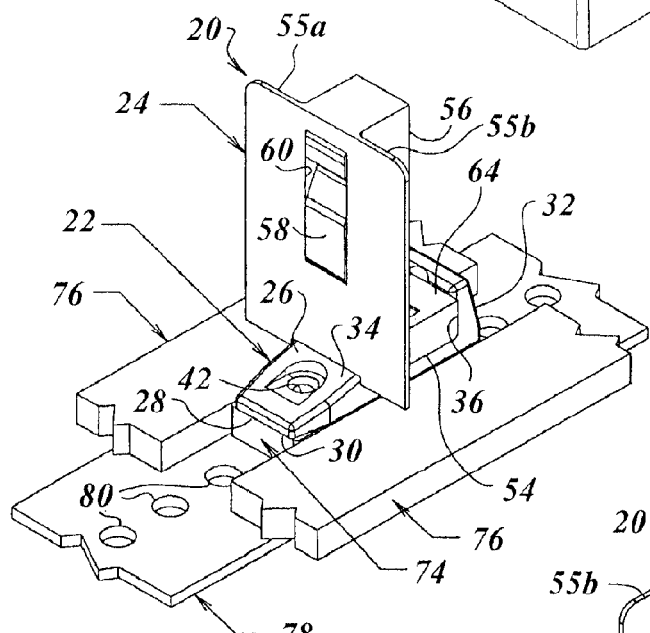
FIGS. 11A and 11B are enlarged perspective views of the aircraft shown in FIG. 1B, respectively illustrating the monument attached to the aircraft floor by the monument fitting assembly, according to yet another alternative embodiment of the claimed invention.
Figure 11B:
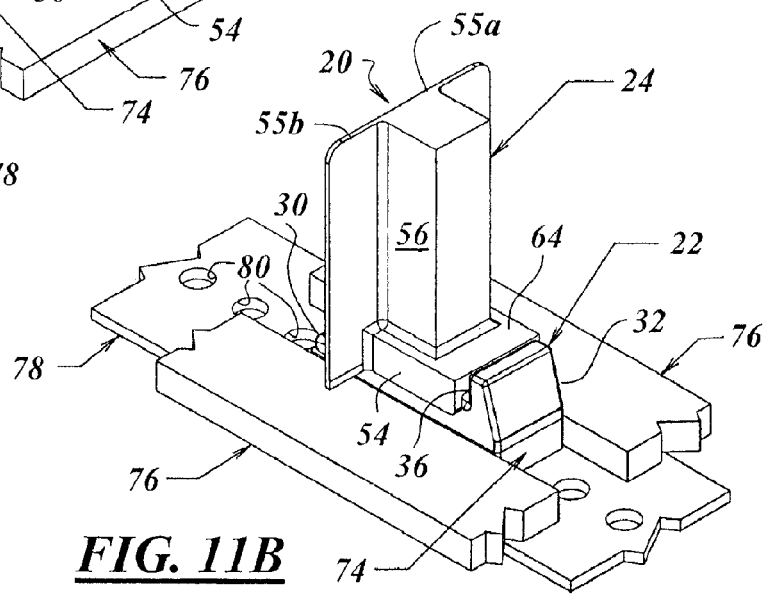

Referring now to the embodiment shown in FIG. 10, the ramp member 22 further includes a supplemental base plate 74, which as shown in FIGS. 11A and 11B increases the clearance between the monument 18 and adjacent floor panels 76 of the airframe 12. In this embodiment, the ramp member 22 is attached to a rail track 78 between the adjacent floor panels 76. Namely, the rail track 78 has a series of through-holes 80 for receiving the bolt fasteners 44 (shown in FIG. 6) extending through the ramp member 22.

Figure 13:
FIG. 13 is a logic flow diagram of a method for manufacturing the aircraft shown in FIGS. 1A and 1B.

With attention to FIG. 13, there is shown a logic flow diagram of a method for manufacturing the aircraft 10 with the monument 18 installed therein by the monument fitting assembly 20. As explained hereinabove, it is contemplated that the monument fitting assembly can be utilized for securing a variety of items together other than the monument 18 and the airframe 12 of the aircraft 10. The method commences in step 100 and then immediately proceeds to step 102.

In step 102, the ramp member 22 is attached to the floor 16 of the aircraft 10. This step is accomplished by inserting bolt members 44 through the countersunk holes 42 within the ramp member 22 and threadably fastening the bolt members 44 to the floor 16 of the airframe 12. In the embodiment shown in FIGS. 11A and 11B, the ramp member 22 is mounted to the rail track 78 in between adjacent floor panels 76. It is contemplated that the ramp member 22 can be installed onto the floor 16 by a variety of suitable means. Then, the sequence proceed to step 104.

In step 104, the monument 18 with one or more fastening bracket members 24 is placed on the floor 16 of the aircraft 10. This step is accomplished by operating a forklift, a crane, a pulley mechanism, other suitable lifting devices, or any combination thereof to lift the monument 18 into the airframe 12 of the aircraft 10. Then, the sequence proceeds to step 106.

In step 106, the monument 18 is moved toward the ramp member 22 along one or more guide lines (not shown) that are etched, scribed, or otherwise marked on the floor 16. In this way, the fastening bracket members 24 are moved in closer proximity to their respective ramp members 22. This step is accomplished by sliding the bottom surface of the monument 18 across the floor 16 toward the ramp member 22 until no further movement is possible. However, other suitable methods can be utilized for moving the fastening bracket members 24 into a fastening engagement with the ramp members 22. The sequence then proceeds to step 108.

In step 108, the fastening bracket members 24 are aligned with the respective ramp members 22. In particular, the tapered first end portion 30 of each ramp member 22 contacts one of the opposing lateral surfaces 68a, 68b and moves the respective fastening bracket member 24 and the monument 18 in a predetermined position on the floor 16. In this embodiment, the decreased width of the tapered first end portion 30 is readily inserted between the opposing lateral surfaces 68a, 68b. Thereafter, the first end portion 30 contacts one of the opposing lateral surfaces 68a and adjusts the position of the fastening bracket member 24 and the monument 18 in one direction away from the other lateral surface 68b of the ramp member 22. In this embodiment, the opposing sidewall surfaces 52a, 52b of the ramp member 22 support the opposing lateral surfaces 68a, 68b in forward and aft directions. The sequence then proceeds to step 110.

In step 110, the lower surface 64 of the fastening bracket member 24 slides across the inclined surface 34 of the ramp member 22 and thus lifts the fastening bracket member 24 and the monument to the predetermined height. Then, the sequence proceeds to step 112.

In step 112, the stop guide surface 36 contacts the fastening bracket member 24 and prevents the fastening bracket member 24 from sliding further across the level mounting surface 38 of the ramp member 22. Then, the sequence proceeds to step 114.

In step 114, the actuator is operated for releasably attaching the fastening bracket member 24 and monument 18 to the ramp member and the floor 16. In this embodiment, as detailed above, the actuator 58 is the lever mechanism that is moved from an unfastened position to a fastened position so as to engage the expandable collet to the seat 48 adjacent to the aperture 46 in the top surface 26 of the ramp member 22. Accordingly, the expandable collet releasably attaches the fastening bracket member 24 to the ramp member 22 in all load-bearing directions and thus attaches the monument 18 to the floor in all load-bearing directions.

While particular embodiments of the invention have been shown and described, numerous variations and alternate embodiments will occur to those skilled in the art. Accordingly, it is intended that the invention be limited only in terms of the appended claims.

What is claimed is:

1. A two-part monument fitting assembly for supporting a monument comprising:
    a ramp member attached to a floor of an aircraft, wherein said ramp member has a top surface, a bottom surface, a height between said top surface and said bottom surface, a pair of opposing sidewall surfaces defining a width and comprising a left sidewall surface and a right sidewall surface, and a pair of opposing end portions comprised of a first end portion and a second end portion wherein said height is generally increasing from said first end portion to said second end portion; and
    a fastening bracket member attached to a monument comprising a first bracket portion comprising an upper surface, a lower surface, and a pair of opposing lateral surfaces extending substantially downward and substantially perpendicular from said lower surface;
    the lower surface of said first bracket portion being substantially in contact with the top surface of said ramp member, and said pair of opposing lateral surfaces of said first bracket portion being substantially in contact with the pair of opposing sidewall surfaces of said ramp member;
    said top surface of said ramp member defining an aperture with a seat;
    said fastening bracket member further comprising:
        a second bracket portion attached to said upper surface of said first bracket portion and attached to and supporting the monument; and
        a longitudinal fastening arm member located generally within the first and second bracket portions, and capable of sliding towards and extending past the lower surface of the first bracket portion; and
    said seat receiving said fastening arm member for releasably attaching said fastening bracket member to said ramp member and securing said monument in a predetermined position.

2. The monument fitting assembly recited in claim 1 wherein said top surface is comprised of:
    an inclined surface adjacent to said first end portion and offset from said bottom surface by a predetermined angle;
    said inclined surface sliding said fastening bracket member thereacross and moving said monument to a predetermined height above said floor;
    a stop guide surface adjacent to said second end portion and substantially perpendicular to said bottom surface;
    said stop guide surface preventing said fastening bracket member from sliding across said top surface and beyond said second end portion; and
    a level mounting surface between said inclined surface and said stop guide surface and substantially parallel to said bottom surface;
    said level mounting surface supporting said fastening bracket member.

3. The monument fitting assembly recited in claim 1 wherein said ramp member has at least one hole extending between said top surface and said bottom surface for receiving at least one bolt fastener and attaching said ramp member to said floor of said aircraft.

4. The monument fitting assembly recited in claim 1 wherein said fastening bracket member comprises:
- an actuator coupled to said fastening arm member;
- said actuator actuating said fastening arm member and releasably attaching said first bracket portion to said ramp member.

5. The monument fitting assembly recited in claim 4 wherein said actuator is selected from the group consisting of a lever mechanism and a nut fastener.

6. previously presented) The monument fitting assembly recited in claim 5 wherein said actuator is a lever mechanism and said lever mechanism is movable between a fastened position and an unfastened position with said lever mechanism in said fastened position stored substantially in a recessed portion of said second bracket portion.

7. The monument fitting assembly recited in claim 5 wherein said fastening arm member is an expandable collet member.

8. An airframe comprising:
- an airframe comprised of an interior and a floor within said interior;
- a monument; and
- a monument fitting assembly releasably attaching said monument within said airframe in a predetermined position;
- said monument fitting assembly comprising a ramp member and a fastening bracket member;
- a ramp member attached to a floor of an aircraft, wherein said ramp member has a top surface, a bottom surface, a height between said top surface and said bottom surface, a pair of opposing sidewall surfaces defining a width and comprising a left sidewall surface and a right sidewall surface, and a pair of opposing end portions comprised of a first end portion and a second end portion wherein said height is generally increasing from said first end portion to said second end portion; and
- a fastening bracket member attached to a monument comprising a first bracket portion comprising an upper surface, a lower surface, and a pair of opposing lateral surfaces extending substantially downward and substantially perpendicular from said lower surface;
- the lower surface of said first bracket portion being substantially in contact with the top surface of said ramp member, and said pair of opposing lateral surfaces of said first bracket portion being substantially in contact with the pair of opposing sidewall surfaces of said ramp member;
- said top surface of said ramp member defining an aperture with a seat;
- said fastening bracket member further comprising:
  - a second bracket portion attached to said upper surface of said first bracket portion and attached to and supporting the monument; and
  - a longitudinal fastening arm member located generally within the first and second bracket portions, and capable of sliding towards and extending past the lower surface of the first bracket portion; and
- said seat receiving said fastening arm member for releasably attaching said fastening bracket member to said ramp member and securing said monument in a predetermined position.

9. The aircraft recited in claim 8 wherein said ramp member has at least one hole extending between said top surface and said bottom surface, receiving at least one bolt fastener, and attaching said ramp member to said floor of said airframe.

10. The aircraft recited in claim 9 wherein said ramp member is attached to said floor by a track system extending across said floor and comprised of at least one rail having at least one opening for receiving said at least one bolt fastener for attaching said ramp member thereto.

* * * * *

UNITED STATES PATENT AND TRADEMARK OFFICE
CERTIFICATE OF CORRECTION

PATENT NO. : 7,614,583 B2  Page 1 of 2
APPLICATION NO. : 11/306030
DATED : November 10, 2009
INVENTOR(S) : Walter L. White It is certified that error appears in the above-identified patent and that said Letters Patent is hereby corrected as shown below:

Delete drawing sheet 7 of 7 and substitute the replacement drawing sheet 7/7 attached to this form.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,614,583 B2 |
| APPLICATION NO. | : 11/306030 |
| DATED | : November 10, 2009 |
| INVENTOR(S) | : Walter L. White |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Nineteenth Day of October, 2010

David J. Kappos
*Director of the United States Patent and Trademark Office*